United States Patent
Merienne et al.

(10) Patent No.: US 9,463,712 B2
(45) Date of Patent: Oct. 11, 2016

(54) METHOD AND DEVICE FOR CONTROLLING A POWERTRAIN

(75) Inventors: Ludovic Merienne, Gif sur Yvette (FR); Abdelmalek Maloum, Chevilly Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 66 days.

(21) Appl. No.: 14/344,481

(22) PCT Filed: Sep. 10, 2012

(86) PCT No.: PCT/FR2012/052018
§ 371 (c)(1),
(2), (4) Date: Mar. 21, 2014

(87) PCT Pub. No.: WO2013/038097
PCT Pub. Date: Mar. 21, 2013

(65) Prior Publication Data
US 2014/0229051 A1 Aug. 14, 2014

(30) Foreign Application Priority Data

Sep. 12, 2011 (FR) ........................... 11 58085

(51) Int. Cl.
*B60L 15/20* (2006.01)
*H02P 21/00* (2016.01)
(Continued)

(52) U.S. Cl.
CPC ........... *B60L 15/20* (2013.01); *H02P 21/0003* (2013.01); *H02P 21/0021* (2013.01);
(Continued)

(58) Field of Classification Search
CPC .... H02P 6/00; H02P 25/021; H02P 21/0003; H02P 21/0085; H02P 21/05; H02P 21/021; H02P 25/024; H02P 2207/05; H02K 16/00; H02K 11/0068; H02K 11/0073; B60L 15/20
See application file for complete search history.

(56) References Cited

U.S. PATENT DOCUMENTS 5,663,626 A * 9/1997 D'Angelo .......... G05B 13/0275
318/799
7,134,180 B2 * 11/2006 Hsu ........................ H02K 16/00
29/596

(Continued)

FOREIGN PATENT DOCUMENTS

| EP | 1650861 A1 * | 4/2006 | |
| EP | 2437391 A1 * | 4/2012 | ............ H02P 6/183 |
| JP | 08 242600 | 9/1996 | |

OTHER PUBLICATIONS

International Search Report Issued Oct. 24, 2012 in PCT/FR12/052018 Filed Sep. 10, 2012.

(Continued)

*Primary Examiner* — Tuan C. To
(74) *Attorney, Agent, or Firm* — Oblon, McClelland, Maier & Neustadt, L.L.P.

(57) ABSTRACT

A method controlling a powertrain fitted in an automobile and including an electric motor including a rotor and stator, the method including: regulation of currents of the rotor and the stator via control signals from the electric motor, wherein the currents and control signals are expressed in a rotating coordinate system and include a plurality of axes, the control signals resulting from a first transformation including a change of variable that enables dynamic decoupling between the control signals, along each of the axes of the plurality of axes; saturation of the control signals resulting from the first transformation to satisfy constraints of a battery fitted in the automobile and connected to the electric motor; and blockage of at least some of the current reference values of the regulation if the control signals are saturated.

6 Claims, 1 Drawing Sheet

(51) Int. Cl.
*H02P 21/05* (2006.01)
*H02P 101/45* (2015.01)

(52) U.S. Cl.
CPC .......... *H02P21/0085* (2013.01); *H02P 21/05* (2013.01); *H02P 25/024* (2016.02); *H02P 2101/45* (2015.01); *H02P 2207/05* (2013.01); *Y02T 10/7258* (2013.01)

(56) References Cited

U.S. PATENT DOCUMENTS

| | | | | |
|---|---|---|---|---|
| 8,169,109 B2* | 5/2012 | Sykes | ...................... | H02K 3/47 310/114 |
| 8,575,879 B2* | 11/2013 | Welchko et al. | ............. | 318/563 |
| 8,754,603 B2* | 6/2014 | Arnett et al. | ................. | 318/432 |
| 8,976,744 B2* | 3/2015 | Yousefi | ................. | H04N 7/183 370/329 |
| 9,077,586 B2* | 7/2015 | Yousefi | ................. | H04N 7/183 |
| 2002/0175649 A1 | 11/2002 | Reutlinger | | |
| 2003/0102751 A1* | 6/2003 | Bryant | ................... | H02K 16/00 310/112 |
| 2004/0135533 A1 | 7/2004 | Harakawa et al. | | |
| 2007/0236098 A1* | 10/2007 | Kusase | ................... | H02K 9/06 310/263 |
| 2010/0134058 A1* | 6/2010 | Nagashima et al. | ..... | 318/400.23 |
| 2011/0031914 A1* | 2/2011 | Green | ...................... | H02P 6/20 318/400.11 |
| 2011/0050141 A1* | 3/2011 | Yeh et al. | ..................... | 318/434 |
| 2011/0221366 A1* | 9/2011 | Gallegos-Lopez et al. | ........................ | 318/400.02 |
| 2013/0015803 A1* | 1/2013 | Arnett et al. | ................ | 318/503 |

OTHER PUBLICATIONS

French Search Report Issued Jun. 1, 2012 in FR 1158085 Filed Sep. 12, 2011.

* cited by examiner

METHOD AND DEVICE FOR CONTROLLING A POWERTRAIN

BACKGROUND

The technical field of the invention is the control of electric motors, and in particular the control of the electric motors of wound rotor synchronous type.

An electric motor of wound rotor synchronous type comprises a fixed part called stator and a moving part called rotor. The stator comprises three windings offset by 120° and powered by alternating current. The rotor comprises one winding powered by direct current.

The currents of the phases of the stator depend on the resistances and inductances of the rotor and of the stator as well as on the mutual inductance between the rotor and the stator.

The control of such a system requires account to be taken of the control saturation phenomena, due in particular to the voltage limits of the battery.

The document U.S. Pat. No. 3,851,234 discloses a method for avoiding the magnetic saturation by reducing the speed of the motor or the torque supplied.

The document U.S. Pat. No. 5,015,937 discloses the control of a synchronous machine with wound rotor in open loop mode with data tables for avoiding saturations.

Finally, the document U.S. Pat. No. 6,181,091 discloses the control of a synchronous machine with permanent magnet in which the saturation is avoided by modifying the operation of the PWM (Pulse Width Modulation) ensuring the voltages on each branch of the motor.

However, there is no provision in the prior art of a saturation making it possible to maintain a dynamic decoupling of the controls.

BRIEF SUMMARY

One aim of the present invention is to improve the quality of regulation of an electric motor of wound rotor synchronous type via a saturation which maintains the decoupling between the control of the rotor and that of the stator.

According to one implementation, there is defined a method for controlling a power train installed in a motor vehicle and comprising an electric motor provided with a rotor and a stator, comprising:

regulation of the rotor and stator currents via control signals for the electric motor, said currents and said control signals being expressed in a revolving reference frame, for example the Park reference frame, and comprising a plurality of axes, said control signals being derived from a first transformation comprising a change of variable allowing for dynamic decoupling between the control signals along each of the axes of said plurality of axes;

saturation of said control signals obtained from said first transformation to satisfy the constraints associated with a battery installed in the motor vehicle and connected to the electric motor; and blocking of at least some of the regulation current setpoints if the control signals are saturated.

The control method has the advantage of a total decoupling between the rotor current setpoints and the stator current setpoints allowing for improved wheel torque setpoint tracking. This decoupling is maintained during saturation since the saturation is applied to the decoupled control signals expressed according to the first transformation. Furthermore, it is possible to ensure a total control of the currents by blocking the current setpoints.

In other words, the saturation strategy ensures stability by virtue of the peak-clipping performed in the decoupled space. Furthermore, since the current setpoints are recalculated in the event of saturation, this makes it possible to reach stable current values as close as possible to the real setpoints even if the setpoints are unreachable. The recalculated current setpoints are therefore the maximum reachable current setpoints.

According to one feature, the method also comprises a second transformation comprising a change of variable that is the reverse of said change of variable allowing for dynamic decoupling so as to express the control signals after saturation in said revolving reference frame without a change of variable.

Thus, it is then possible to express the control signals directly in the Park reference frame for example.

According to an additional feature, the method also comprises a communication of information relating to the saturation of the control signals and the blocking of the regulation current setpoints is performed on the basis of this information.

It is thus possible to block the current setpoints so as to avoid the saturation of the control signals.

According to another implementation, there is defined a system for controlling a power train installed in a motor vehicle and comprising an electric motor provided with a rotor and a stator, comprising:

means for regulating the rotor and stator currents using control signals for the electric motor, said currents and said control signals being expressed in a revolving reference frame, for example, the Park reference frame, and comprising a plurality of axes, said control signals being obtained from a first transformation comprising a change of variable allowing for the dynamic decoupling of the control signals along each of the axes of said plurality of axes;

means for saturating said control signals obtained from said first transformation to satisfy the constraints associated with a battery installed in the motor vehicle and connected to the electric motor; and a blocking means configured to perform the blocking of at least some of the current setpoints of the regulation means if the control signals are saturated.

According to one feature, the system also comprises a means for computing a second transformation comprising a change of variable that is the reverse of said change of variable allowing for the dynamic decoupling so as to express the control signals after saturation in said revolving reference frame without a change of variable.

According to an additional feature, the system also comprises means for communicating information relating to the saturation of the control signals and the blocking means blocks the current setpoints of the regulation means on the basis of this information.

BRIEF DESCRIPTION OF THE DRAWINGS

Other aims, features and advantages will become apparent on reading the following description, given purely as a nonlimiting example and with reference to the appended drawings in which.

DETAILED DESCRIPTION

Figure 1:
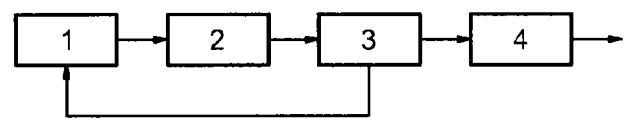
FIG. 1 illustrates a method for controlling an electric power train.

To assure the regulation of a power train comprising a synchronous motor comprising a stator and a rotor and installed in a vehicle, an inverter is used that makes it possible to control the voltage of the stator phases and a chopper for controlling the rotor voltage. These two devices are powered by a battery installed in the vehicle.

A Park reference frame is also used, which makes it possible to express the electrical quantities in a revolving reference frame for example linked to the rotor in the case of a synchronous motor. This reference frame comprises three axes: d, q and f. The axes d and q are associated with the stator and the axis f is associated with the rotor. The control signals for the electric motor $V_d$, $V_q$, $V_f$ and the current setpoints applied $I_d$ $I_q$ $I_f$ correspond to the components of a control signal and of a current respectively along the axes: d, q, f.

In the Park reference frame, a power train comprising a synchronous motor is governed by the following equations:

$$V_d = R_s \cdot I_d + L_d \cdot \frac{dI_d}{dt} + M_f \cdot \frac{dI_f}{dt} - \omega_r \cdot L_q \cdot I_q \quad \text{(Eq. 1)}$$

$$V_q = R_s \cdot I_q + L_q \cdot \frac{dI_q}{dt} + \omega_r (L_d \cdot I_d + M_f \cdot I_f)$$

$$V_f = R_f \cdot I_f + L_f \cdot \frac{dI_f}{dt} + \alpha \cdot M_f \cdot \frac{dI_d}{dt}$$

with:
$L_d$: Armature equivalent inductance on the axis d.
$L_q$: Armature equivalent inductance on the axis q.
$L_f$: Rotor inductance.
$R_s$: Equivalent resistance of stator windings.
$R_f$: Resistance of the rotor.
$M_f$: Mutual inductance between the stator and the rotor.
$I_d$: Current on the axis d.
$I_q$: Current on the axis q.
$I_f$: Current on the axis f.
$\omega_r$: Rotation speed.
$V_d$: Electric motor control signal on axis d.
$V_q$: Electric motor control signal on axis q.
$V_f$: Electric motor control signal on axis f.
a: A coefficient, for example equal to 1.5.

The values $L_d$, $L_q$, $L_f$, $R_s$, $R_f$ and $M_f$ are, for example, known from prior measurements.

The main difficulties controlling this type of system lie in the dynamic coupling between the axes d and f, and in the voltage constraints of the power supply battery installed in the vehicle.

To avoid the dynamic coupling between the axes d and f, a change of variables is provided: $(\tilde{V}_d, \tilde{V}_q, \tilde{V}_f)$–$S(V_d, V_q, V_f)$, using the following equation:

$$V_d = \tilde{V}_d - \frac{M_f}{L_f} \cdot \left( R_f \cdot I_f + \frac{a \cdot M_f}{L_d} \cdot (\omega_r \cdot L_q \cdot I_q - R_s \cdot I_d) - \tilde{V}_f \right) \quad \text{(Eq. 2)}$$

$$V_q = \tilde{V}_q$$

$$V_f = \tilde{V}_f + \frac{a \cdot M_f}{L_d} \cdot \tilde{V}_d$$

The system to be controlled can then be represented by the following equations:

$$\tilde{V}_d = R_s \cdot I_d + L_d \cdot \frac{dI_d}{dt} - \omega_r \cdot L_q \cdot I_q \quad \text{(Eq. 3)}$$

$$\tilde{V}_q = R_s \cdot I_q + L_q \cdot \frac{dI_q}{dt} + \omega_r \cdot (L_d \cdot I_d + M_f \cdot I_f)$$

$$\tilde{V}_f = R_f \cdot I_f + L_f \cdot \frac{dI_f}{dt} - \frac{3M_f}{2L_d} \cdot (R_s \cdot I_d - \omega_r \cdot L_q \cdot I_q)$$

with:
$\tilde{V}_d$: Stator decoupled voltage on the axis d.
$\tilde{V}_q$: Stator voltage on the axis q.
$\tilde{V}_f$: Decoupled voltage of the rotor.

As can be seen, there is no change of variable on the axis q which does not exhibit any dynamic coupling. The dynamic coupling is between the axes d and f, hence the new controls decoupled on these two axes.

With regard to the voltage constraints of the power supply battery with the respective use of an inverter and of a chopper, they are described by the following equation 4:

$$V_d^2 + V_q^2 \leq \frac{V_{bat}^2}{3} \quad \text{(Eq. 4)}$$

$$-V_{bat} \leq V_f \leq V_{bat}$$

With Vbat being the voltage of the battery.

FIG. 1 proposes a control method which makes it possible to calculate control signals $\tilde{V}_d$, $\tilde{V}_q$, $\tilde{V}_f$ for controlling the currents $I_d$, $I_q$ and $I_f$ so as to satisfy the torque demands on the wheel while resolving the main difficulties mentioned above which lie in the dynamic coupling between the axes d and f, and in the voltage constraints of the power supply battery installed in the vehicle.

The method comprises a step 1. This step comprises a step of acquisition of the current setpoints (see step 2), namely the following setpoints:
$I_d^{ref}$: the stator current setpoint on the axis d.
$I_q^{ref}$: the stator current setpoint on the axis q.
$I_f^{ref}$: the rotor current setpoint on the axis f.

The current setpoints are directly linked to the engine torque demand.

The step 1 also comprises a step of blocking of the current setpoints $I_d^{ref}$, $I_q^{ref}$, $I_f^{ref}$ which will be described later in the description. The current setpoints then become: $I_d^{ref}$_sat, $I_q^{ref}$_sat, $I_f^{ref}$_sat.

The step 1 is followed by a step 2 in which the rotor and stator currents ($I_d$, $I_q$, $I_f$) are regulated with control signals ($\tilde{V}_d$, $\tilde{V}_q$, $\tilde{V}_f$) for the electric motor for the rotor and stator currents ($I_d$, $I_q$, $I_f$) to reach the current setpoint values $I_d^{ref}$_sat, $I_q^{ref}$_sat, $I_f^{ref}$_sat. For this, the regulator is synthesized in the following form:

$$\tilde{V}_d = K_d \cdot (I_d^{ref}\_sat - I_d) + K_{id} \cdot \int (I_d^{ref}\_sat - I_d)$$

$$\tilde{V}_q = K_q \cdot (I_q^{ref}\_sat - I_q) + K_{iq} \cdot \int (I_q^{ref}\_sat - I_q)$$

$$\tilde{V}_f = K_f (I_f^{ref}\_sat - I_f) + K_{if} \int (I_f^{ref}\_sat - I_f) \quad \text{(Eq. 5)}$$

With $K_d$, $K_q$, $K_f$, $K_{id}$, $K_{iq}$, $K_{if}$ being the setting parameters.

The currents and the control signals of equation 5 (Eq. 5) are expressed in the Park reference frame.

The control signals are obtained from a first transformation comprising a change of variable described by equation 2 (Eq. 2). Thus, the regulator makes it possible to determine a voltage along the axis d ($\tilde{V}_d$) dependent on the current derivatives only by virtue of the component of the current along the axis d($I_d$). Similarly, the voltage along the axis q ($\tilde{V}_q$) and the rotor voltage ($\tilde{V}_f$) along the axis f depend on the current derivatives only by the component of the current along the axis q($I_q$) and along the axis f($I_f$) respectively. The dynamic couplings between the axes d, q, f are therefore eliminated at the regulator level. There is a static coupling which is compensated by the integral component of the regulator.

The regulation step also comprises a step of measuring of the currents $I_d$, $I_q$ and $I_f$, followed by a filtering and a scaling of these measurements. The regulation step also comprises a step of acquisition of the setting parameters.

The step 2 is followed by a step 3 of saturation of the control signals ($\tilde{V}_d$, $\tilde{V}_q$, $\tilde{V}_f$).

To saturate the control signals calculated in step 2, it would be possible, according to a first, non-optimal solution, to calculate the controls $V_d$, $V_q$, $V_f$ actually applied to the system in the Park reference frame without the change of variable of the equation 2 and then to saturate these controls to satisfy the constraints associated with the battery in the Park reference frame in accordance with equation 4 (Eq. 4). That said, this first solution is not optimal because, by performing the saturation in the Park reference frame without the change of variable of equation 2, the dynamic decoupling is lost. In practice, in the case of saturation in the Park reference frame, the value of the controls ($V_d$, $V_q$, $V_f$) will be modified by clipping without necessarily retaining the decoupling which was present for the controls $\tilde{V}_d$, $\tilde{V}_q$, $\tilde{V}_f$ obtained from the change of variable. This can result in risks of loss of control of the motor.

In the method illustrated in FIG. 1, in step 3, a saturation of the controls calculated in the step 2 is performed according to a more advantageous second solution which comprises a saturation of the controls $\tilde{V}_d$, $\tilde{V}_q$, $\tilde{V}_f$ obtained from the first transformation comprising the change of variable using equation 2 (Eq. 2).

For this, $$A_f = R_f \cdot I_f + \frac{a \cdot M_f}{L_d} \cdot (\omega_r \cdot L_q \cdot I_q - R_s \cdot I_d)$$

is deposited, and equations 2 and 4 (Eq. 2 and Eq. 4) are combined; the following inequalities are thus obtained:

$$\left(\tilde{V}_d + \frac{M_f}{L_f} \cdot \tilde{V}_f - \frac{M_f}{L_f} \cdot A_f\right)^2 + \tilde{V}_q^2 \leq \frac{V_{bat}^2}{3}$$

and $$\left(\tilde{V}_f + \frac{a \cdot M_f}{L_d} \cdot \tilde{V}_d\right)^2 \leq V_{bat}^2$$

The following inequalities are therefore deduced therefrom:

$$-V_{bat} \leq \tilde{V}_f + \frac{a \cdot M_f}{L_d} \cdot \tilde{V}_d \leq V_{bat}$$

and $$-\sqrt{\frac{V_{bat}^2}{3} - \tilde{V}_q^2} \leq \tilde{V}_d + \frac{M_f}{L_f} \cdot \tilde{V}_f - \frac{M_f}{L_f} \cdot A_f \leq \sqrt{\frac{V_{bat}^2}{3} - \tilde{V}_q^2}$$

which implies:

$$\frac{L_d}{a \cdot M_f} \cdot (-V_{bat} - \tilde{V}_f) \leq \tilde{V}_d \leq \frac{L_d}{a \cdot M_f} \cdot (V_{bat} - \tilde{V}_f) \quad \text{(Eq. 6)}$$

and $$-\sqrt{\frac{V_{bat}^2}{3} - \tilde{V}_q^2} - \frac{M_f}{L_f} \cdot \tilde{V}_f + \frac{M_f}{L_f} \cdot A_f \leq \tilde{V}_d \quad \text{(Eq. 7)}$$

$$\tilde{V}_d \leq \sqrt{\frac{V_{bat}^2}{3} - \tilde{V}_q^2} - \frac{M_f}{L_f} \cdot \tilde{V}_f + \frac{M_f}{L_f} \cdot A_f$$

Thus, to ensure that there is a $\tilde{V}_d$ that satisfies equations 6 and 7 (Eq. 6), (Eq. 7), the following should apply:

$$-\sqrt{\frac{V_{bat}^2}{3} - \tilde{V}_q^2} - \frac{M_f}{L_f} \cdot \tilde{V}_f + \frac{M_f}{L_f} \cdot A_f \leq \frac{L_d}{a \cdot M_f} \cdot (V_{bat} - \tilde{V}_f)$$

and $$\sqrt{\frac{V_{bat}^2}{3} - \tilde{V}_q^2} - \frac{M_f}{L_f} \cdot \tilde{V}_f + \frac{M_f}{L_f} \cdot A_f \leq \frac{L_d}{a \cdot M_f} \cdot (-V_{bat} - \tilde{V}_f)$$

The following inequality 8 (Eq. 8) is deduced therefrom:

$$-\frac{1}{L_d \cdot L_f - a \cdot M_f^2}\left(a \cdot M_f \cdot L_f \cdot \sqrt{\frac{V_{bat}^2}{3} - \tilde{V}_q^2} + a \cdot M_f^2 \cdot A_f + L_d \cdot L_f \cdot V_{bat}\right) \leq \tilde{V}_f \quad \text{(Eq. 8)}$$

and $$\tilde{V}_f \leq \frac{1}{L_d \cdot L_f - a \cdot M_f^2}\left(a \cdot M_f \cdot L_f \sqrt{\frac{V_{bat}^2}{3} - \tilde{V}_q^2} - a \cdot M_f^2 \cdot A_f + L_d \cdot L_f \cdot V_{bat}\right)$$

The controls obtained from the first transformation comprising the change of variable of equation 2 can then be saturated by defining the maximum and minimum limits of the control signals $\tilde{V}_d$, $\tilde{V}_q$, $\tilde{V}_f$:

$$B\min\_\tilde{V}_d \leq \tilde{V}_d \leq B\max\_\tilde{V}_d,$$

with $$B\min\_\tilde{V}_d = \max\left(\frac{L_d}{\alpha \cdot M_f} \cdot (-V_{bat} - \tilde{V}_f), -\sqrt{\frac{V_{bat}^2}{3} - \tilde{V}_q^2} - \frac{M_f}{L_f} \cdot \tilde{V}_f + \frac{M_f}{L_f} \cdot A_f\right)$$

and $$B\max\_\tilde{V}_d = \min\left(\frac{L_d}{\alpha \cdot M_f} \cdot (V_{bat} - \tilde{V}_f), \sqrt{\frac{V_{bat}^2}{3} - \tilde{V}_q^2} - \frac{M_f}{L_f} \cdot \tilde{V}_f + \frac{M_f}{L_f} \cdot A_f\right)$$

-continued $$B\min\_\tilde{V}_q \le \tilde{V}_q \le B\max\_\tilde{V}_q,$$

with $$B\min\_\tilde{V}_q = -\sqrt{\frac{V_{bat}^2}{3}}$$

and $$B\max\_\tilde{V}_q = \sqrt{\frac{V_{bat}^2}{3}}$$

$$B\min\_\tilde{V}_f \le \tilde{V}_f \le B\max\_\tilde{V}_f,$$

with $$B\min\_\tilde{V}_f = -\frac{1}{L_d \cdot L_f - a \cdot M_f^2} \cdot \left( a \cdot M_f \cdot L_f \cdot \sqrt{\frac{V_{bat}^2}{3} - \tilde{V}_q^2} + \alpha \cdot M_f^2 \cdot A_f + L_d \cdot L_f \cdot V_{bat} \right)$$

and $$B\max\_\tilde{V}_f = \frac{1}{L_d \cdot L_f - a \cdot M_f^2} \cdot \left( a \cdot M_f \cdot L_f \cdot \sqrt{\frac{V_{bat}^2}{3} - \tilde{V}_q^2} - a \cdot M_f^2 \cdot A_f + L_d \cdot L_f \cdot V_{bat} \right)$$

Then, the control signals $\tilde{V}_d$, $\tilde{V}_q$, $\tilde{V}_f$ are saturated, that is to say that the control signals are clipped when these signals depart from the bands defined by the maximum and minimum limits. For this, $\tilde{V}_q$ is first of all clipped, for which the limits depend only on the Vbat value, then $\tilde{V}_f$ is clipped, for which the limits depend only on the Vbat values and on the calculated saturated value of $\tilde{V}_q$, and finally $\tilde{V}_d$ for which the limits depend on the Vbat value and on the calculated saturated values of $\tilde{V}_q$ and $\tilde{V}_f$.

In other words, sat($\tilde{V}_q$) is calculated according to the following equation:

sat($\tilde{V}_q$)=$\tilde{V}_q$, if $B\min\_\tilde{V}_q \le \tilde{V}_q \le B\max\_\tilde{V}_q$ sat($\tilde{V}_q$)=$B\min\_\tilde{V}_q$, if $\tilde{V}_q < B\min\_\tilde{V}_q$ sat($\tilde{V}_q$)=$B\max\_\tilde{V}_q$, if $\tilde{V}_q > B\max\_\tilde{V}_q$ by using Vbat Then sat($\tilde{V}_f$) is calculated according to the following equation:

sat($\tilde{V}_f$)=$\tilde{V}_f$, if $B\min\_\tilde{V}_f \le \tilde{V}_f \le B\max\_\tilde{V}_f$ sat($\tilde{V}_f$)=$B\min\_\tilde{V}_f$, if $\tilde{V}_f < B\min\_\tilde{V}_f$ sat($\tilde{V}_f$)=$B\max\_\tilde{V}_f$, if $\tilde{V}_f > B\max\_\tilde{V}_f$ by using the Vbat value and the calculated sat($\tilde{V}_q$) value Then sat($\tilde{V}_d$) is calculated according to the following equation:

sat($\tilde{V}_d$)=$\tilde{V}_d$, if $B\min\_\tilde{V}_d \le \tilde{V}_d \le B\max\_\tilde{V}_d$ sat($\tilde{V}_d$)=$B\min\_\tilde{V}_d$, if $\tilde{V}_d < B\min\_\tilde{V}_d$ sat($\tilde{V}_d$)=$B\max\_\tilde{V}_d$, if $\tilde{V}_d > B\max\_\tilde{V}_d$ by using the Vbat value and the sat($\tilde{V}_q$) and sat($\tilde{V}_f$) values.

In step 1, in order to keep a total control of the currents, a blocking is imposed on the current setpoints $I_d^{ref}$, $I_q^{ref}$, $I_f^{ref}$ to obtain the current setpoints $V_d^{ref}\_sat$, $I_q^{ref}\_sat$ and $I_f^{ref}\_sat$ according to the following principle:

If $\tilde{V}_d$ reaches its maximum limit $B\max\_\tilde{V}_d$, the increasing of the setpoint is stopped at $I_d$. In practice, according to equation 3 (Eq. 3), this would cause $\tilde{V}_d$ to be increased even further. Similarly, the setpoint is not reduced at $I_q$. Finally, the setpoint is not increased at $I_f$. In practice, by blocking the increasing of the setpoint at $I_f$ according to equation 3 (Eq. 3) an increase of $\tilde{V}_f$ is avoided which would reduce the maximum limit of $\tilde{V}_d$ $B\max\_\tilde{V}_d$ according to equations 6 and 7 (Eq. 6, Eq. V).

If $\tilde{V}_d$ reaches its maximum limit $B\min\_\tilde{V}_d$, the reducing of the setpoint is stopped at $I_d$. In practice, according to equation 3 (Eq. 3), this would cause $\tilde{V}_d$ to be reduced even further. Similarly, the setpoint is not increased at $I_q$. Finally, the setpoint is not reduced at $I_f$. In practice, the reducing of the setpoint at $I_f$ would cause $\tilde{V}_f$ to be reduced according to equation 3 (Eq. 3) and a consequential increase of the minimum limit of $\tilde{V}_d$ $B\min\_\tilde{V}_d$ according to equations 6 and 7 (Eq. 6, Eq. V).

If $\tilde{V}_q$ reaches its maximum limit $B\max\_\tilde{V}_q$, then no current setpoint should be increased further according to equation 3 (Eq. 3).

Similarly, if $\tilde{V}_q$ reaches its minimum limit $B\min\_\tilde{V}_q$, then no current setpoint should be reduced further.

Finally, if $\tilde{V}_f$ reaches one of its limits $B\min\_\tilde{V}_f$ or $B\max\_\tilde{V}_f$, this phenomenon is only temporary because the axis f supports only low currents. This will therefore create a dynamic saturation of the trend of the current in the rotor but this does not pose any problem of stability. There is no need to saturate one of the current setpoints in this case.

Finally, in the step 4, there is a second transformation comprising a change of variable that is the reverse of the change of variable of equation 2 (Eq. 2). In other words, the saturated control signals sat($V_d$), sat($V_q$), sat($V_f$) are calculated in the Park reference frame without a change of variable according to the saturated control signals sat($\tilde{V}_d$), sat($\tilde{V}_q$), sat($\tilde{V}_f$) by using the variable change equation 2 (Eq. 2). The control signals sat($V_d$), sat($V_q$), sat($V_f$) are then applied to the synchronous motor. More specifically, the signals sat($V_d$), sat($V_q$) are applied to the stator and the signal sat($V_f$) is applied to the rotor.

The control method obtained is efficient from a point of view of the reliability and robustness with respect to disturbances. It allows for a saturation which does not disturb the dynamic decoupling of the change of variable. The risks of racing and of loss of control of the motor are thus avoided.

Figure 2:
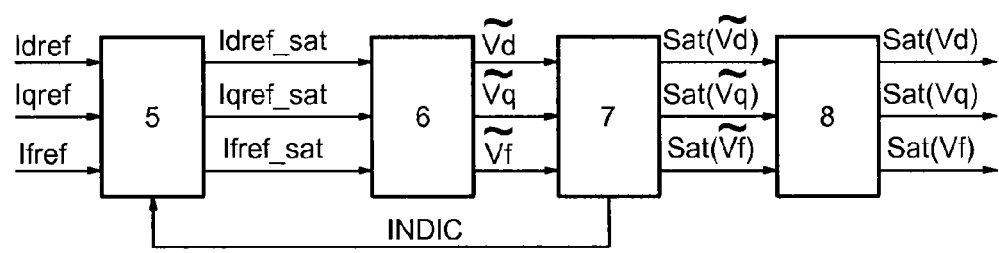
FIG. 2 illustrates a device for controlling an electric power train.

FIG. 2 shows a control device comprising a means for blocking the current setpoints 5 which applies the blocking of the currents described in step 1 of the method. The blocking means also comprises a means for acquiring current setpoints, namely:

$I_d^{ref}$: the stator current setpoint on the axis d.
$I_q^{ref}$: the stator current setpoint on the axis q.
$I_f^{ref}$: the rotor current setpoint on the axis f.

The blocking means 5 comprises a means for receiving an indication INDIC which indicates if one of the controls $\tilde{V}_d$, $\tilde{V}_q$, $\tilde{V}_f$ has reached the minimum and maximum limits defined in step 4 of the method. Based on this saturation indication the blocking means blocks the corresponding current setpoints $I_d^{ref}$ $I_q^{ref}$ $I_f^{ref}$ as is defined for step 1 of the method.

The blocking means 5 is linked at the output to a means 6 for regulating the intensities of the rotor and of the stator $I_d$, $I_q$ and $I_f$. For this, the regulation means 6 applies equation 5 (Eq. 5).

The control device is linked to sensors. The regulation means comprises a means for processing the signals from the sensors and a data acquisition means. The processing means is capable of filtering and scaling the signals received from the sensors.

Among the signals received from the sensors, there are the measurements of the currents $I_d$, $I_q$ and $I_f$ and, optionally, the values $L_d$, $L_q$, $L_f$, $R_s$, $R_f$ and $M_f$.

Among the data acquired by the acquisition means, there are the setting parameters $K_d$, $K_g$, $K_f$, $K_{id}$, $K_{iq}$, $K_{if}$.

The regulation means 6 is linked at the output to the saturation means 7. The saturation means saturates the control signals $\tilde{V}_d$, $\tilde{V}_q$, $\tilde{V}_f$ obtained from said first transformation according to step 3 of the method to obtain the signals sat($\tilde{V}_d$), sat($\tilde{V}_q$) and sat($\tilde{V}_f$).

The saturation means 7 is linked at the output to a transformation means 8 capable of determining the signals sat($V_d$), sat($V_q$), sat($V_f$), based on the transformed signals sat($\tilde{V}_d$), sat($\tilde{V}_q$) and sat($\tilde{V}_f$). For this, the transformation means 8 applies equation 2 (Eq. 2). The control signals sat($V_d$), sat($V_q$), sat($V_f$), are then applied to the synchronous motor. More specifically, the signals sat(Vd), sat($V_q$) are applied to the stator and the signal sat($V_f$) is applied to the rotor.

The saturation means 7 is configured to transmit to the blocking means 5 the saturation indication INDIC. For this, it comprises means for communicating the information INDIC.

The invention claimed is:

1. A method for controlling a power train installed in a motor vehicle and including an electric motor including a rotor and a stator, the method comprising:

regulation of rotor and stator currents via control signals for the electric motor, the currents and the control signals being expressed in a revolving reference frame and including a plurality of axes, the control signals being derived from a first transformation including a change of variable allowing for dynamic decoupling between the control signals along each of the axes of the plurality of axes;

saturation of the control signals obtained from the first transformation to satisfy constraints associated with a battery installed in the motor vehicle and connected to the electric motor, the saturation of the control signals including defining maximum and minimum limits for each of the control signals and clipping the control signals when the control signals are outside of the maximum and minimum limits to produce saturated control signals;

after the saturation of the control signals, blocking of at least some of regulation current setpoints; and controlling the rotor and the stator of the electric motor based on the saturated control signals.

2. The method as claimed in claim 1, further comprising a second transformation including a change of variable that is reverse of the change of variable allowing for dynamic decoupling to express the control signals after the saturation in the revolving reference frame without a change of variable.

3. The method as claimed in claim 1, further comprising communication of information relating to the saturation of the control signals, and wherein the blocking of the regulation current setpoints is performed based on the information.

4. The method as claimed in claim 1, wherein the reference frame in which the currents and the control signals are expressed is a Park reference frame.

5. The method as claimed in claim 1, wherein the blocking includes, when one of the regulation current setpoints reaches a maximum limit, preventing the other regulation current setpoints from increasing further.

6. The method as claimed in claim 1, wherein the blocking includes, when one of the regulation current setpoints reaches a minimum limit, preventing the other regulation current setpoints from reducing further.

* * * * *